United States Patent [19]

Wu

[11] 4,266,046
[45] May 5, 1981

[54] ESTERIFICATION PROCESS

[75] Inventor: Yulin Wu, Bartlesville, Okla.

[73] Assignee: Phillips Petroleum Company, Bartlesville, Okla.

[21] Appl. No.: 724,189

[22] Filed: Sep. 17, 1976

[51] Int. Cl.$^3$ .................. C07C 67/24; C07C 69/82; C08G 63/42

[52] U.S. Cl. .................. 528/309; 528/272; 528/285; 528/296; 528/298; 528/307; 528/308; 528/271; 560/84; 560/85; 560/86; 560/89; 560/127; 560/193; 560/194; 560/198

[58] Field of Search .......... 260/475 P, 485 G, 468 K, 260/75 R, 75 C; 560/89, 84, 85, 86, 198, 193, 194, 127; 528/285, 272, 296, 298, 307, 308, 309

[56] References Cited

U.S. PATENT DOCUMENTS

| | | | |
|---|---|---|---|
| 2,448,767 | 9/1948 | Carlson | 260/284 |
| 2,766,258 | 10/1956 | Malkemus | 260/340.2 |
| 2,784,201 | 3/1957 | Chetwood | 260/340.2 |
| 2,799,667 | 7/1957 | Drewitt et al. | 260/77.5 |
| 2,870,124 | 1/1959 | Ham | 260/75 |
| 3,009,903 | 11/1961 | Lincoln | 260/75 |
| 3,549,692 | 12/1970 | Böckmann et al. | 260/475 P |
| 3,641,112 | 2/1972 | Ichikawa et al. | 260/475 P |
| 3,798,257 | 3/1974 | Wu | 260/475 P |
| 3,842,040 | 10/1974 | Browne et al. | 260/475 P |

FOREIGN PATENT DOCUMENTS 845937  7/1949  Fed. Rep. of Germany ....... 260/475 P

Primary Examiner—Jane S. Myers

[57] ABSTRACT

Cyclic carbonate esters are reacted with polycarboxylic acids to produce bis(hydroxyalkyl) esters from aromatic polycarboxylic acids in the presence of selected catalysts comprising at least one of phosphines, phosphonium halides, sulfonium halides, sulfoxonium halides, and ammonium and alkyl ammonium halides. In the preferred embodiment, ethylene carbonate is reacted with terephthalic acid to produce bis(2-hydroxyethyl) terephthalate and/or polymers thereof.

6 Claims, No Drawings

ESTERIFICATION PROCESS

This invention relates to the preparation of bis(hydroxyalkyl) esters of aromatic polycarboxylic acids. In accordance with another aspect, this invention relates to a process for reacting cyclic carbonate esters with aromatic polycarboxylic acids to produce bis(hydroxyalkyl) esters of the carboxylic acids in the presence of selected catalysts. In accordance with another aspect, this invention relates to catalysts comprising at least one of phosphines, phosphonium halides, sulfonium halides, sulfoxonium halides, and ammonium and alkyl ammonium halides for the reaction of cyclic carbonate esters with polycarboxylic acids to produce high molecular weight polyesters. In accordance with a preferred aspect, this invention relates to a process for the production of hydroxyethyl esters of terephthalic acid and higher molecular weight oligomers thereof by reacting terephthalic acid with ethylene carbonate in the presence of selected catalysts.

The prior art has disclosed the use of alkylene oxides such as ethylene oxide for the esterification of carboxylic acids such as dicarboxylic acids in the preparation of polyesters. However, a number of problems have been encountered which have severely limited the utility of this process in the preparation of high molecular weight polyesters. For example, the esterification of a solid, relatively high-melting acid with alkylene oxides such as ethylene oxide has required the use of high pressures and relatively high temperatures, but these conditions have also been found to be hazardous in the utilization of alkylene oxides such as ethylene oxide because of their relative instability toward decomposition and their instability toward homopolymerization in the presence of various reagents which may be present in only trace amounts. On the other hand, the use of cyclic carbonate esters of vicinal diols such as ethylene carbonate (1,2-ethanediol carbonate) offers a number of advantages in the esterification reaction for the preparation of high molecular weight polyesters. Specifically, said carbonate esters are generally much more stable, easier to handle, and therefore less hazardous in high temperature and relatively high pressure reactions than the corresponding alkylene oxides. Furthermore, the cyclic carbonate esters are generally of very high solvating ability both for the initial carboxylic acid reactant, as well as low molecular weight intermediates in the esterification process. This latter characteristic enables generally a much more easily controlled reaction and a much more easily handled reaction mixture from the standpoint of mixing and handling said mixture.

The instant invention provides suitable catalysts for the esterification of carboxylic acids with cyclic carbonate esters which is of particular utility in the formation of high molecular weight polyesters for uses such as fibers, molding resins, and the like.

Accordingly, it is an object of this invention to provide an improved process for the esterification of carboxylic acids to produce high molecular weight polyesters.

Another object of this invention is to provide catalysts effective for the esterification of carboxylic acids to high molecular weight polyesters.

A further object of this invention is to provide an improved catalyzed process for the production of esterified products of terephthalic acid.

Other objects, aspects, and the several advantages of this invention will be apparent to those skilled in the art upon a study of this specification and the appended claims.

In accordance with this invention bis(hydroxyalkyl) esters of polycarboxylic acids are produced by reacting at least one cyclic carbonate ester with at least one polycarboxylic acid in the presence of a catalytically effective amount of at least one catalyst material selected from phosphines, phosphonium halides, sulfonium halides, sulfoxonium halides, and ammonium and alkyl ammonium halides.

In accordance with one embodiment of the invention, terephthalic acid and ethylene carbonate react readily to form esterified products of terephthalic acid such as hydroxyethyl esters of terephthalic acid and higher molecular weight oligomers thereof by carrying out the reaction in the presence of selected catalysts defined herein.

The cyclic carbonate esters which can be utilized according to the instant invention can be represented by the general formula:

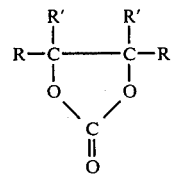

wherein each R and each R' are individually selected from the group consisting of hydrogen and hydrocarbyl radicals having from 1 to 10 carbon atoms and wherein both R' radicals can represent a divalent aliphatic hydrocarbon radical which together with the carbonate group in said cyclic carbonate ester can form a cycloaliphatic nucleus. Suitable carbonate esters which can be utilized contain from 3 to 31 carbon atoms per molecule and can be named as the carbonate esters of vicinal diols containing from 2 to 30 carbon atoms per molecule which correspond to the general formula:

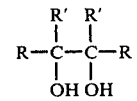

wherein each R and R' are as defined above.

Examples of suitable cyclic carbonate esters which can be employed in the process of this invention include the cyclic carbonate esters of the following vicinal diols: 1,2-ethanediol; 1,2-propanediol; 1,2,3,4-tetrahydro-1,2-naphthalenediol; 3,3-dimethylcyclobutane-1,2-diol; 3,3,4,4-tetramethylcyclobutane-1,2-diol; 2,3-dimethyl-2,3-butanediol; 2-methyl-2,3-butanediol; 2-methyl-1,2-propanediol; 2,3-butanediol; 2-phenyl-1,2-ethanediol; 1,2-butanediol; 1,2-pentanediol; 1-phenyl-1,2-butanediol; 2-phenyl-1,2-pentanediol; and 1-(2-methylphenyl)cyclohexane-1,2-diol.

The cyclic carbonate esters of vicinal diols are well known in the art. Such esters can be prepared by the reaction of a vicinal chlorohydrin with an alkali metal carbonate, bicarbonate, or sesquicarbonate under pressure of carbon dioxide, as disclosed in U.S. Pat. No. 2,766,258, J. D. Malkemus, issued Oct. 9, 1956. Such esters can also be prepared by the reaction of a vicinal chlorohydrin with an alkali metal alkyl carbonate, as disclosed in U.S. Pat. No. 2,784,201, H. C. Chitwood, issued Mar. 5, 1957.

The above-described cyclic carbonate esters of vicinal diols are utilized to react with polycarboxylic acids having the general formula $Z(CO_2H)_n$ wherein Z is a hydrocarbon radical having the valence equal to n and wherein n is an integer having a value from 2 to 4. Examples of suitable polycarboxylic acids which can be utilized in the instant invention include oxalic acid, malonic acid, succinic acid, glutaric acid, adipic acid, suberic acid, azelaic acid, sebacic acid, 1,2,3-propane-tricarboxylic acid, 1,2-cyclohexane dicarboxylic acid, 1,4-cyclohexane dicarboxylic acid, phthalic acid, isophthalic acid, terephthalic acid, 1,3,5-benzene tricarboxylic acid (trimesic acid), 1,2,4-benzene tricarboxylic acid (trimellitic acid), 1,2,4,5-benzene tetracarboxylic acid (pyromellitic acid), and the like. The instant invention is believed to have its greatest utility in the utilization of the cyclic carbonate esters described above for the esterification of aromatic polycarboxylic acids in the preparation of polyesters which are of widely known utility. Thus, a preferred group of polycarboxylic acids within those described by the general formula above are those wherein Z is an aromatic hydrocarbon radical.

Catalysts suitable for use in the process of this invention are selected from one of the following:

A. Phosphines having the formula $R''_3P$, wherein $R''$ is selected from the group consisting of hydrogen, alkyl, cycloalkyl, aryl, alkenyl, cycloalkenyl, and combinations thereof having from 1 to 10 carbon atoms;

B. Phosphonium halides having the formula $(R''_4P)^+X^-$, wherein $R''$ is as previously defined and wherein $X^-$ is a halide ion selected from the group consisting of chloride, bromide, and iodide;

C. Sulfonium halides having the general formula $(R''_3S)^+X^-$ wherein $R''$ and X are as defined above;

D. Sulfoxonium halides having the formula $(R''_3S \rightarrow O)^+X^-$ wherein $R''$ and X are as defined above; and E. Ammonium and alkyl ammonium halides having the formula $(R''_4N)^+X^-$ wherein $R''$ and X are as defined above.

Examples of suitable catalysts include triphenylphosphine, tributylphosphine, triethylphosphine, trimethylphosphine, tribenzylphosphine, methyltriphenylphosphonium bromide, ethyltriphenylphosphonium bromide, tetrabutylphosphonium bromide, tetrabutylphosphonium chloride, tetraphenylphosphonium bromide, tetraphenylphosphonium chloride, triphenylbenzylphosphonium chloride, allyldiethylsulfonium chloride, allyldimethylsulfonium bromide, benzyldiethylsulfonium chloride, benzyldimethylsulfonium iodide, benzylethylvinylsulfonium chloride, tertiary-butyldimethylsulfonium chloride, tertiary-butylmethylpropylsulfonium iodide, trimethylsulfonium bromide, diisopentylmethylsulfonium iodide, cyclooctyldimethylsulfonium iodide, trimethylsulfoxonium bromide, trimethylsulfoxonium chloride, ethyldimethylsulfoxonium bromide, ammonium iodide, ammonium chloride, ammonium bromide, methylamine hydrochloride, dimethylamine hydrochloride, triethylamine hydrobromide, tetramethylammonium chloride, tetrabutylammonium bromide, tetraethylammonium iodide, aniline hydrochloride, diphenylamine hydrobromide, and the like, as well as mixtures thereof.

In the process of the instant invention the amount of cyclic carbonate ester which is reacted with the polycarboxylic acid to esterify said polycarboxylic acid can be expressed in terms of a ratio of gram-moles of carbonate ester per gram-equivalent of carboxy group in the polycarboxylic acid. Broadly, said ratio is in the range of from about 0.05/1 up to about 50/1 and preferably from about 0.25/1 up to about 2.5/1. It is especially preferred for the preparation of high molecular weight polyesters that the ratio of gram-moles carbonate ester to gram-equivalent of carboxyl group be slightly in excess of 0.5/1.

The amount of catalyst previously described which is utilized in the esterification process of the instant invention is broadly from about 0.001 up to about 20 weight percent based on the amount of cyclic carbonate ester employed and preferably from about 0.01 up to about 5 weight percent on the same basis.

The temperature employed in the esterification reaction according to the instant invention is broadly from about 50° C. to about 450° C. and preferably from about 100° C. to about 300° C.

The reaction time utilized in the esterification process of the instant invention depends generally upon the temperature employed, the amount of catalyst, and the reactivity of the cyclic carbonate ester and the polycarboxylic acid. Usually, the time employed will be in the range of from one minute up to about six hours.

Although not absolutely necessary, it is desirable that reduced pressure be utilized during the esterification reaction according to the instant invention since volatile by-products are generated in the esterification reaction and since, as is well known, condensation polymerization reactions are generally carried out under reduced pressure in order to obtain acceptably high molecular weight polymeric products.

The esterification reaction according to the instant invention can be carried out, if desired, in the presence of added inert diluents although this is generally not necessary nor usually desirable in order to simplify recovery procedures. If excess cyclic carbonate ester is utilized, this reactant can also serve the function of diluent or solvent for the reaction mixture. Suitable inert diluents include hydrocarbons such as benzene, toluene, decane, and cyclohexane; ethers such as 1,2-dimethoxyethane and tetrahydrofuran; and cyclic sulfones such as sulfolane. When an added inert diluent is used, the amount will range from 10 to 200 weight percent of the starting carbonate ester.

The process of this invention can be carried out in a batch, semicontinuous, or continuous manner.

Carbon dioxide is a by-product of the esterification process according to the instant invention and can be recovered, if desired, for reaction with olefin oxides to generate the cyclic carbonate ester according to procedures known in the art. Evolution of carbon dioxide from the reaction mixture can, in some instances, provide a beneficial effect in terms of promoting mixing of the reactants in the reaction zone.

The instant invention can be utilized to prepare hydroxylalkyl esters of the polycarboxylic acids or relatively low molecular weight polyesters having hydroxyalkyl or carboxyl end groups. However, the most important utility of the instant invention is believed to reside in its use in the preparation of high molecular weight polyesters which are suitable for fiber formation and the like. In the latter instance, the reaction mixture, which may initially generate low molcular weight polyester materials, can be heated under vacuum in order to provide the higher molecular weight polyester product under conditions which are known in the art for the esterification of polycarboxylic acids with diols such as ethylene glycol.

EXAMPLE I

A 50-ml round bottom flask equipped with a magnetic stirrer and heating mantle was used as a reaction vessel. The temperature was controlled at 200° C. The reaction vessel was charged with 8.3 grams (0.05 moles) of terephthalic acid and 10 grams (0.114 moles) of ethylene carbonate along with 0.015 grams of tetramethylammonium chloride. The reaction mixture was stirred and heated, and evolution of carbon dioxide was observed when the temperature reached about 160° C. After about 1.5 hours at 200° C., the mixture became clear. The reaction mixture was then poured into cold water to recover the products. Solid product was filtered from the mixture, washed with acetone, and dried in the air. The product melted over a range of 162°–174° C. Infrared analysis of the product showed that the carbonyl frequency of the terephthalic acid had been shifted from 1650 cm$^{-1}$ to 1740 cm$^{-1}$ which is characteristic of the terephthalate ester function.

In another run, 16.8 grams (0.101 moles) of terephthalic acid and 13.2 grams (0.15 moles) of ethylene carbonate along with 0.015 grams of tetrabutylphosphonium chloride was charged to the reaction vessel and the mixture heated at 130° C. for two hours. In this run, an oil bath was used to provide heating means for the reaction vessel. At the end of the two-hour reaction period, the solid terephthalic acid had disappeared and the liquid melt was clear. The recovered material from the reaction zone had a melting point of 197°–210° C.

Another run was carried out utilizing 16.6 grams (0.1 moles) of terephthalic acid with 15.8 grams (0.18 moles) of ethylene carbonate with 0.05 grams of tetrabutylphosphonium chloride for a total weight of 32.45 grams. The mixture was stirred in a 100-ml three-necked round bottom flask at 210°–215° C., utilizing an oil bath for the heating medium for a period of 1.5 hours. The reaction mixture became liquid in about one hour. The amount of product recovered weighed 23.9 grams.

The results of the above runs demonstrate that in the presence of the catalyst of the instant invention terephthalic acid and ethylene cabonate react readily to form esterified products of terephthalic acid, such as hydroxyethyl esters of terephthalic acid and higher molecular weight oligomers thereof.

EXAMPLE II

Another run was carried out according to the instant invention in which provision was made for determining the amount of water and carbon dioxide evolved from the reaction mixture by a water absorbent vessel and a carbon dioxide absorbent vessel in series and lastly an oil-filled tube with a gas bubbler to detect the end of gaseous by-product evolution in the reaction. The reaction vessel was charged with 16.6 grams (0.1 moles) of terephthalic acid, 15.8 grams (0.18 moles) of ethylene carbonate, and 0.05 grams of tetrabutylphosphonium chloride for a total charge of 32.45 grams. The reaction mixture was stirred in the reaction flask, utilizing an oil bath for heating at 210°–215° C. for 1.5 hours. The mixture became liquid within one hour. No bubbles were detected in the bubble tube after this period which indicated that gaseous by-products had been absorbed by the absorbent tubes. The water absorbent tube indicated a weight gain of 1.17 grams (0.065 moles), and the carbon dioxide absorbent tube indicated a weight gain of 6.37 grams (0.143 moles). The reaction mixture in the vessel weighed 23.92 grams which indicated that gaseous by-products should have weighed 8.53 grams whereas the water and carbon dioxide absorbent tubes accounted for 7.54 grams. The melting point of the cooled reaction product was 120°–154° C. Material balance calculations indicated that the reaction product was a polyester having three units derived from ethylene carbonate and two units derived from terephthalic acid.

EXAMPLE III

As a control run, the reaction of terephthalic acid, 16.6 grams (0.1 mole), and ethylene carbonate, 16.5 grams (0.19 moles), was examined in essentially the same apparatus as that utilized in Example II above. The terephthalic acid and ethylene carbonate were mixed in a 100-ml round bottom flask equipped with mechanical stirring means. The mixture was heated to about 214°–217° C., utilizing an oil bath for the heating medium. The reaction mixture became a slurry only after six hours heating and only after eight hours heating at 214°–217° C. did the solid terephthalic acid disappear in the reaction mixture. The reaction product from the reaction vessel was recovered in essentially the same manner as that described in Example II. For a total charge of 33.1 grams, there was recovered 25.26 grams of solid polymeric product which indicated a loss by gaseous by-products of 7.74 grams. The carbon dioxide absorbed amounted to 6.55 grams, and the water absorbed amounted to 0.18 grams for a total of 6.73 grams. This result demonstrates that although ethylene carbonate can react with terephthalic acid to produce an esterification product the reaction is much slower in the absence of a catalyst according to the instant invention as evidenced by the much slower disappearance of the solid terephthalic acid in the reaction mixture. Infrared spectral examination of the product from Example II and Example III indicated that there was some unreacted ethylene carbonate in the product recovered only from the run of Example III.

EXAMPLE IV

Another run was carried out according to the instant invention wherein 16.63 grams (0.10 moles) of terephthalic acid and 13.21 grams (0.15 moles) of ethylene carbonate was reacted in the presence of 0.020 grams of tetrabutylphosphonium chloride. The reaction mixture was heated at 225° C. for two hours with mechanical stirring means. An oil bath was utilized to provide the heating medium. The solid terephthalic acid disappeared within a period of about 1.5 hours. The reaction was continued with stirring for 0.5 hours and then cooled. Total charge of materials to the reaction vessel was 29.86 grams, and there was recovered 22.18 grams of solid product indicating a loss by evolution of gaseous by-products of 7.68 grams. The carbon dioxide absorbed amounted to 5.31 grams (0.12 moles) and the water absorbed amounted to 0.96 grams (0.053 moles). The sum of carbon dioxide, water, and solid polymeric material recovered amounted to 95.4 percent of the original weight of materials charged to the reaction mixture. The solid material was also analyzed by infrared analysis which indicated the typical terephthalate ester groups were present and the melting point of the solid product was 196°–205° C. Based on the material balance and the observed melting point, the solid product is believed to be a polyester composed of four units from ethylene carbonate and three units from terephthalic acid. Such a material has been reported to have a melting point of 201° C.

EXAMPLE V

In another run according to the instant invention, 16.63 grams (0.10 moles) of terephthalic acid, 13.21 grams (0.15 moles) of ethylene carbonate, and 0.023 grams of tetrabutylphosphonium chloride was heated at 125° C. for five hours at the end of which time the solid phase had disappeared. The weight of the solid material in the reaction vessel indicated a loss of gaseous by-products of 7.61 grams whereas there was recovered in the carbon dioxide absorber 6.18 grams and the water absorber 0.81 grams for a total of 6.99 grams of these products. The esterification product was further treated by adding 0.1 grams of antimony oxide ($Sb_2O_3$) and heating the mixture at 170° C. for three hours during which time ethylene glycol was distilled from the reaction mixture under vacuum (30 mm mercury). There was recovered 1.2 ml of ethylene glycol during this heating step. The final esterification product had a melting point of 124°–147° C. and was green in color. The product of this run was not further analyzed.

EXAMPLE VI

In another run according to the instant invention, 16.63 grams (0.10 moles) of terephthalic acid, 9.68 grams (0.11 moles) of ethylene carbonate, and 0.17 grams of tetrabutylphosphonium chloride were mixed at 100° C. and then heated at 240°–250° C. until no off gas bubbles were detected in the previously described oil tube connected to the reaction vessel. This required 2.75 hours. The weight loss by evolution of gaseous products amounted to 5.8 grams whereas the carbon dioxide recovered in the carbon dioxide absorber amounted to 4.2 grams and the water absorbed amounted to 0.4 grams for a total of 4.6 grams. The esterification product was then further distilled under vacuum (15 mm mercury) at 180° C. for three hours during which time 0.65 grams of ethylene glycol was recovered from this further condensation. The product thus recovered had a melting point of 140°–150° C. The product from this run was not analyzed further.

EXAMPLE VII

In another run according to the instant invention, 16.63 grams (0.10 moles) of terephthalic acid, 9.68 grams (0.11 moles) of ethylene carbonate, and 0.01 grams of tetrabutylphosphonium chloride were reacted in the following manner. The ethylene carbonate was mixed with the catalyst, tetrabutylphosphonium chloride, at 110° C. To this solution was added the terephthalic acid, thereby forming a slurry in the reaction vessel. The reaction temperature was increased to 130° C. for 2.5 hours at the end of which time no evidence of carbon dioxide evolution was observed. The temperature then was increased to 265° C., and the solid phase had disappeared by 1.5 hours. To this reaction mixture then was added 0.003 grams of antimony oxide dispersed in 0.3 grams of ethylene glycol. The reaction mixture was heated further at 265° C. for 0.75 hours, and then under vacuum (6 mm mercury) for a period of four hours to remove ethylene glycol formed in the condensation reaction. The reaction product was allowed to cool and solidify. The melting point determined for this product was 251°–254° C. The inherent viscosity of the esterification product was determined to be 0.159 as measured at 30° C. on a concentration of 0.50 grams per 100 ml of a solvent mixture of phenol/tetrachloroethane (3/2 by weight). This inherent viscosity value indicates a degree of polymerization value of 19 for the esterification product.

The results of the runs carried out according to the instant invention described above demonstrate that the catalysts of this invention provide a ready esterification of terephthalic acid with ethylene carbonate and that by subsequent heating under high vacuum in the presence of a typical esterification catalyst that a high molecular weight polyester can be produced.

I claim:

1. A process for the preparation of esters of polycarboxylic acids which comprises reacting:
   (a) at least one cyclic carbonate ester represented by the general formula

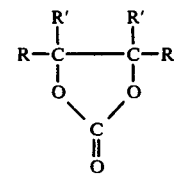

wherein each R and each R' are individually selected from the group consisting of hydrogen and hydrocarbyl radicals having from 1 to 10 carbon atoms and wherein both R' radicals can represent a divalent aliphatic hydrocarbon radical which together with the carbonate group in said cyclic carbonate ester can form a cycloaliphatic nucleus; with
   (b) at least one polycarboxylic acid having the general formula $Z(CO_2H)_n$ wherein Z is a hydrocarbon radical having the valence equal to n and wherein n is an integer having a value from 2 to 4; in the presence of
   (c) a catalytically effective amount of a catalyst selected from the group consisting of
   alkyl ammonium halides having the formula $(R''_4N)^+X^-$ wherein R'' is selected from the group consisting of alkyl, cycloalkyl, aryl, alkenyl, cycloalkenyl, and combinations thereof having from 1 to 10 carbon atoms and wherein $X^-$ is a halide ion selected from the group consisting of chloride, bromide, and iodide; under conditions which will produce esters of polycarboxylic acids.

2. A process according to claim 1 wherein the amount of (a) with respect to (b) in terms of a ratio of gram-moles of carbonate ester per gram-equivalent of carboxy group in the polycarboxylic acid ranges from about 0.05/1 to about 50/1, the amount of (c) based upon (a) ranges from about 0.001 to about 20 weight percent, and the temperature ranges from about 50° C. to about 450° C.

3. A process according to claim 1 wherein the amount of (a) with respect to (b) in terms of a ratio of gram-moles of carbonate ester per gram-equivalent of carboxy group in the polycarboxylic acid is slightly in excess of 0.5/1.

4. A process according to claim 1 wherein (a) is ethylene carbonate, (b) is terephthalic acid, and (c) is an alkyl ammonium chloride.

5. A process according to claim 6 wherein (c) is tetramethylammonium chloride.

6. A process according to claim 1 wherein the reaction mixture is heated under a reduced pressure so as to remove volatile by-products generated and produce high molecular weight polyester products.

* * * * *